United States Patent
Cho

(10) Patent No.: US 8,900,748 B2
(45) Date of Patent: Dec. 2, 2014

(54) NEGATIVE ACTIVE MATERIAL AND LITHIUM BATTERY INCLUDING THE NEGATIVE ACTIVE MATERIAL

(75) Inventor: Yu-Jeong Cho, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 233 days.

(21) Appl. No.: 13/478,412

(22) Filed: May 23, 2012

(65) Prior Publication Data

US 2013/0136995 A1    May 30, 2013

(30) Foreign Application Priority Data

Nov. 28, 2011    (KR) .................. 10-2011-0125120

(51) Int. Cl.
*H01M 4/38* (2006.01)
*H01M 4/134* (2010.01)

(52) U.S. Cl.
USPC .............. 429/218.1; 429/231.8; 977/762

(58) Field of Classification Search
None
See application file for complete search history.

(56) References Cited

U.S. PATENT DOCUMENTS

| | | | |
|---|---|---|---|
| 2009/0258298 A1* | 10/2009 | Umeno et al. | 429/231.8 |
| 2010/0297502 A1 | 11/2010 | Zhu et al. | |
| 2011/0309306 A1 | 12/2011 | Zhou et al. | |
| 2012/0028798 A1 | 2/2012 | Worsley et al. | |

FOREIGN PATENT DOCUMENTS

| KR | 1020070097775 | | 10/2007 |
|---|---|---|---|
| KR | 1020110052595 | A | 5/2011 |

* cited by examiner

*Primary Examiner* — Jonathan Crepeau
(74) *Attorney, Agent, or Firm* — Robert E. Bushnell, Esq.

(57) ABSTRACT

A negative active material and a lithium battery including the negative active material. The negative active material includes a carbonaceous substrate with a plurality of recessed portions at its surface; and a silicon-based nanowire placed in each of the recessed portions. The negative active material provides the silicon-based nanowires with separate places to control volumetric expansion of the silicon-based nanowires, and thus, a lithium battery including the negative active material has improved efficiency and lifetime.

16 Claims, 3 Drawing Sheets

NEGATIVE ACTIVE MATERIAL AND LITHIUM BATTERY INCLUDING THE NEGATIVE ACTIVE MATERIAL

CLAIM OF PRIORITY

This application makes reference to, incorporates the same herein, and claims all benefits accruing under 35 U.S.C. §119 from an application earlier filed in the Korean Intellectual Property Office on Nov. 28, 2011 and there duly assigned Serial No. 10-2011-0125120.

BACKGROUND OF THE INVENTION

1. Field of the Invention

One or more embodiments of the present invention relate to a negative active material and a lithium battery including the negative active material.

2. Description of the Related Art

Lithium secondary batteries used in portable electronic devices for information communication, such as PDAs, mobile phones, or notebook computers, electric bicycles, electric vehicles, or the like have a discharge voltage that is at least twice as high as that of a conventional battery and thus have high energy density.

Lithium secondary batteries generate an electric energy due to oxidation and reduction reactions occurring when lithium ions are intercalated into/deintercalated from a positive electrode and a negative electrode, each including an active material that enables intercalation and deintercalation of lithium ions, with an organic electrolytic solution or a polymer electrolytic solution interposed between the positive electrode and the negative electrode.

As a positive active material for lithium secondary batteries, for example, an oxide that includes lithium and transition metal and has a structure enabling intercalation of lithium ions may be used, and examples of such an oxide are a lithium cobalt oxide ($LiCoO_2$), a lithium nickel oxide ($LiNiO_2$), a lithium nickel cobalt manganese oxide ($Li[NiCoMn]O_2$ or $Li[Ni_{1-x-y}Co_xM_y]O_2$), etc.

As a negative active material, studies on a carbonaceous material and a non-carbonaceous material, which enable intercalation or deintercalation of lithium ions, are being performed. Examples of a carbonaceous material are artificial and natural graphite, and hard carbon. An example of a non-carbonaceous material is Si.

A non-carbonaceous material has very high capacity that is 10 times greater than that of graphite. Electric conductivity of the non-carbonaceous material is, however, low, and during charging and discharging lithium, the non-carbonaceous material may volumetrically expand or shrink, and thus, its capacity retention rate, charge/discharge efficiency, and lifetime characteristics may be degraded. Accordingly, there is a need to develop a highly performing negative active material with improved efficiency and lifetime characteristics due to control on volumetric expansion.

SUMMARY OF THE INVENTION

One or more embodiments of the present invention include an improved negative active material.

One or more embodiments of the present invention include a negative active material that controls volumetric expansion of a silicon-based nanowire.

One or more embodiments of the present invention include a lithium battery including the negative active material.

Additional aspects will be set forth in part in the description which follows and, in part, will be apparent from the description, or may be learned by practice of the presented embodiments.

According to one or more embodiments of the present invention, a negative active material includes a carbonaceous substrate with a plurality of recessed portions at its surface; and a silicon-based nanowire placed in each of the recessed portions.

According to an embodiment of the present invention, the carbonaceous substrate may have a spherical or lump shape.

According to an embodiment of the present invention, the carbonaceous substrate may have a circularity of about 0.2 to about 1.0. For example, the circularity of the carbonaceous substrate may be in a range of about 0.7 to about 1.0, or about 0.8 to about 1.0, or about 0.9 to about 1.0.

According to an embodiment of the present invention, the carbonaceous substrate may include a crystalline carbonaceous material.

According to an embodiment of the present invention, the crystalline carbonaceous material may include at least one selected from the group consisting of natural graphite, artificial graphite, expandable graphite, graphene, carbon black, and fullerene soot.

According to an embodiment of the present invention, the carbonaceous substrate may have pores therein and a porosity of the carbonaceous substrate may be in a range of about 5% to about 30% based on a total volume of the carbonaceous substrate.

According to an embodiment of the present invention, the carbonaceous substrate may include an amorphous carbonaceous coating layer at its surface and the recessed portions are formed in the amorphous carbonaceous coating layer.

According to an embodiment of the present invention, an average particle size of the carbonaceous substrate may be in a range of about 1 μm to about 30 μm.

The recessed portions may have an average diameter of about 50 nm to about 5 μm and a depth of about 1 μm or more.

The recessed portions may be arrayed in a honeycomb shape.

According to an embodiment of the present invention, the silicon-based nanowires may include at least one material selected from the group consisting of Si, SiOx (0<x≤2), and Si—Z alloys (where Z is not Si and is an element selected from a group consisting of alkali metal, alkali earth metal, a Group 13 element, a Group 14 element, transition metal, a rare earth element, and a combination thereof).

According to an embodiment of the present invention, the silicon-based nanowire may have a diameter of about 10 nm to about 100 nm and a length of about 0.1 μm to about 10 μm.

According to an embodiment of the present invention, a length of each of the silicon-based nanowires may be smaller than a depth of a corresponding recessed portion.

According to an embodiment of the present invention, the silicon-based nanowires may be formed by growth directly in the recessed portions. In this regard, the silicon-based nanowires may be formed by growth in the presence or absence of at least one of Pt, Fe, Ni, Co, Au, Ag, Cu, Zn, and Cd.

According to one or more embodiments of the present invention, a lithium battery may be constructed with a negative electrode including the negative active material, a positive electrode disposed facing the negative electrode, and an electrolyte disposed between the negative electrode and the positive electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
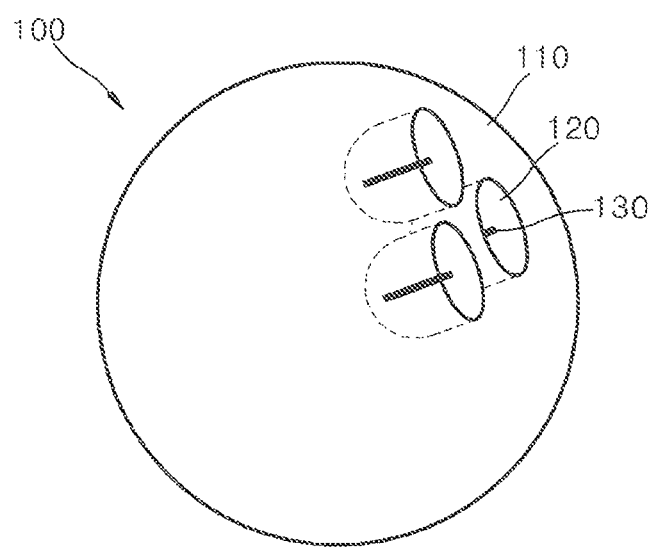
FIG. 1 is a schematic view of a negative active material constructed as an embodiment according to the principles of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the present invention will be described in detail.

A negative active material constructed as an embodiment according to the principles of the present invention includes a carbonaceous substrate with a plurality of recessed portions at its surface, and a silicon-based nanowire placed in each of the recessed portions.

FIG. 1 is a schematic view of a negative active material 100 constructed as an embodiment according to the principles of the present invention. Referring to FIG. 1, the negative active material 100 includes a carbonaceous substrate 110 with a plurality of recessed portions 120 at the surface of the carbonaceous substrate 110, and a silicon-based nanowire 130 placed in each of the recessed portions 120.

The carbonaceous substrate 110 may function as a support for fixing the silicon-based nanowires 130 and may also suppress a volumetric change of the silicon-based nanowires 130 during charging and discharging.

The carbonaceous substrate 110 may have a spherical or lump shape. In the specification and the claims of the present invention, the term "spherical" refers to a complete or incomplete spherical shape, or an oval shape. Also, at least a portion of the spherical carbonaceous substrate may have a curved or winding external shape, or the spherical carbonaceous substrate have an uneven surface. Also, in the specification and the claims of the present invention, the term "lump" refers to any lump shape that has an uneven surface and does not have a particular orientation.

A degree of roundness of the carbonaceous substrate 110 may be confirmed by measuring a circularity thereof. The circularity refers to a measurement value indicating how far the measured shape is modified from a complete circle and has a range of 0 to 1, and if the circularity is closer to 1, the measured shape is more circular. According to an embodiment of the present invention, a circularity of the carbonaceous substrate 110 may be in a range of about 0.2 to about 1, for example, about 0.7 to about 1, or for example, about 0.8 to about 1, or for example, about 0.9 to about 1.

The spherical or lump-shape carbonaceous substrate 110 may constitute a primary particle included in the negative active material of the present invention. Compared to a planar or plate carbonaceous core, the carbonaceous substrate 110 is not orientated in a particular direction during pressing (press-molding) in a manufacturing process, and is thus suitable for obtaining high-rate discharge characteristics, low-temperature characteristics, or the like. Also, a specific surface area of the carbonaceous substrate 110 is reduced and thus reactivity with an electrolytic solution is decreased. Thus, a lithium battery formed with the spherical or lump-shape carbonaceous substrate 110 as the primary particle in the negative active material has improved cyclic characteristics.

Also, the term "carbonaceous" refers to inclusion of about 50 wt % of carbon. For example, the carbonaceous substrate 110 may include at least about 60 wt %, 70 wt %, 80 wt %, or 90 wt % of carbon, or may include 100 wt % of carbon alone.

According to an embodiment of the present invention, the carbonaceous substrate 110 may include as the carbon component, a crystalline carbonaceous material. In this regard, the term "crystalline" refers to inclusion of about 50 wt % of a hexagonal crystal lattice structure in which a carbon atom having a $sp^2$ hybrid orbital is covalently bonded to other three carbon atoms. For example, the crystalline carbonaceous material may include about 60 wt %, about 70 wt %, about 80 wt %, or about 90 wt % of the hexagonal crystal lattice structure of carbon, or may include about 100 wt % of the hexagonal crystal lattice structure of carbon alone. The hexagonal crystal lattice structure may be a single- or multi-layer structure, or may be, based on a 2-dimensional shape, curved, curled, or partially defected. The hexagonal crystal lattice structure may also have various other structures. For example, the hexagonal crystal lattice structure may be connected in a soccer ball shape. The crystal structure of the crystalline carbonaceous material may not be limited as long as lithium ions are reversibly intercalated or deintercalated during charging and discharging. For example, a plane interval (d002) of a (002) plane due to X-ray diffraction of the crystalline carbonaceous material may be equal to or greater than 0.333 nm and less than 0.339 nm, for example, equal to or greater than 0.335 nm and less than 0.339 nm, or equal to or greater than 0.337 nm and equal to or less than 0.338 nm.

The crystalline carbonaceous material may be natural graphite, artificial graphite, expandable graphite, grapheme, carbon black, fullerene soot, or a combination thereof, but is not limited thereto.

Natural graphite is a graphite that is naturally formed, and examples thereof are flake graphite, high crystalline graphite, microcrystalline, cryptocrystalline, amorphous graphite, etc. Artificial graphite is a graphite that is artificially synthesized, and is formed by heating amorphous carbon at high temperature, and examples thereof are primary or electrographite, secondary graphite, graphite fiber etc. Expandable graphite is a graphite that is formed by intercalating a chemical material, such as an acid or alkali, between graphite layers, followed by heating to swell a vertical layer of a molecular structure. Graphene refers to a single layer of graphite. Carbon black is a crystalline material that has less regular structure than graphite, and when carbon black is heated at a temperature of about 3,000□ for a long period of time, the carbon black may be changed into graphite. Fullerene soot refers to a carbon mixture including at least 3 wt % of fullerene that is a polyhedron bundle that consists of 60 or more carbon atoms. The carbonaceous substrate 110 may include one of these crystalline carbonaceous materials or a combination of two or more thereof. For example, natural graphite may be used because an assembly density is easily increased in manufacturing a negative electrode.

The crystalline carbonaceous material may be subjected to, for example, a spherical treatment to form a spherical carbonaceous substrate. For example, in the case of a spherical carbonaceous substrate obtained by performing a spherical treatment on graphite, the spherical carbonaceous substrate is obtained by curing or winding a layered graphite, or the formed spherical carbonaceous substrate may have a microstructure that consists of a plurality of curved or winding scales, or scale-shaped graphite.

According to an embodiment of the present invention, the carbonaceous substrate 110 is formed in a spherical shape through the spherical treatment, thereby having pores therein. The pores present inside the carbonaceous substrate 110 may contribute to a decrease in volumetric expansion of silicon-based nanowires during charging and discharging. According to an embodiment of the present invention, the carbonaceous substrate 110 may have a porosity of about 5 to about 30%, for example, about 10 to about 20%, based on a total volume of the carbonaceous substrate 110.

An average particle size (or diameter) of the carbonaceous substrate 110 may not be limited. However, if the average particle size (or diameter) of the carbonaceous substrate 110 is too small, reactivity with an electrolytic solution is too high and thus cyclic characteristics of a formed lithium battery may be degraded. On the other hand, if the average particle size of the carbonaceous substrate 110 is too large, dispersion stability in preparing a negative electrode slurry is decreased and a formed negative electrode may be a rough surface. For example, an average particle size (or diameter) of the carbonaceous substrate 110 may be in a range of about 1 µm to about 30 µm. For example, the average particle size (or diameter) of the carbonaceous substrate 110 may be in a range of about 5 µm to about 25 µm, or for example, about 10 µm to about 20 µm.

The carbonaceous substrate 110 includes the recessed portions 120 at its surface.

The recessed portions 120 house the silicon-based nanowires 130 respectively, and withstand the volumetric expansion of the silicon-based nanowires 130 during charging and discharging of lithium within the limited spaces, so that structural collapse of the negative active material 100 is prevented and thus efficiency and lifetime decrease thereof may be prevented.

Figure 2:
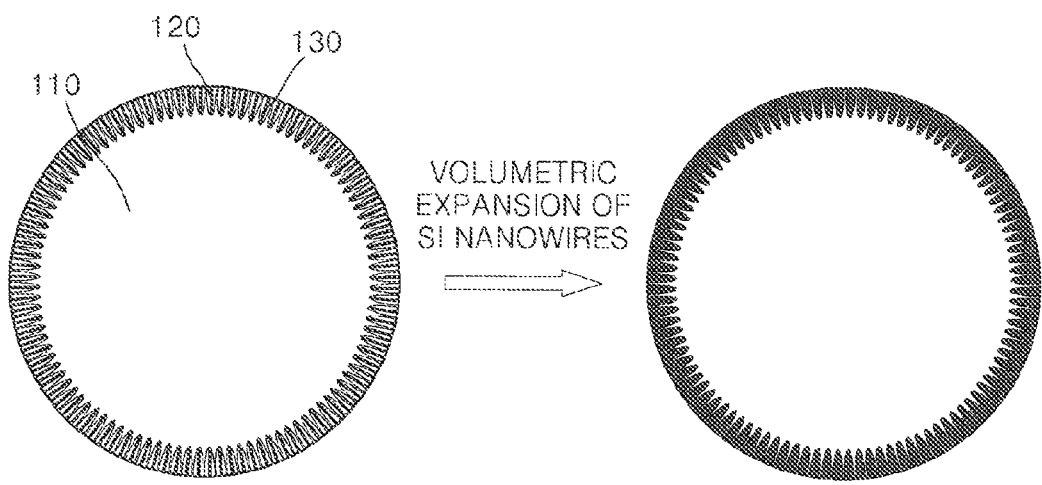
FIG. 2 schematically illustrates how a negative active material constructed as an embodiment according to the principles of the present invention controls the volumetric expansion of a silicon-based nanowire due to charging and discharging.

FIG. 2 schematically illustrates how the negative active material 100 according to an embodiment of the present invention controls the volumetric expansion of the silicon-based nanowires 130 placed in the recessed portions 120 due to charging and discharging. As illustrated in FIG. 2, the expansion of the negative active material 100 is controlled in such a manner that the silicon-based nanowires 130 volumetrically expand within the limited spaces, that is, within inner spaces of the recessed portions 120.

Each of the recessed portions 120 may have a long and dented shape extending from the surface to the center of the carbonaceous substrate 110 to place the corresponding silicon-based nanowire 130 therein. Also, sizes of the recessed portions 120 are determined to secure a space that sufficiently withstands the volumetric expansion of the silicon-based nanowires 130. For example, the recessed portions 120 may have an average diameter of about 50 nm to about 5 µm and a depth of 1 µm or more. For example, the recessed portions 120 may have an average diameter of about 400 nm to about 1500 nm and a depth of about 1.5 µm to about 10 µm. The nanowire 130 placed in each one of the recessed portions 120 extends along a direction from the center of the carbonaceous substrate 110 to the surface of the carbonaceous substrate 110.

According to an embodiment of the present invention, the recessed portions 120 may be arrayed at uniform intervals on the surface of the carbonaceous substrate 110, but the array structure may not be limited thereto and the recessed portions 120 may also have any other array structure. Also, the number of the recessed portions 120 may vary according to the surface area of the carbonaceous substrate 110. For example, the recessed portions 120 may be densely arrayed at uniform intervals to include as many high-capacity silicon-based nanowires as possible. For example, the recessed portions 120 may be arrayed in a honeycomb shape.

According to an embodiment of the present invention, an amorphous carbonaceous coating layer may be further disposed on the surface of the carbonaceous substrate 110. The term "amorphous" refers to an indefinite crystal structure. The amorphous carbonaceous coating layer may include, for example, at least about 50 wt %, about 60 wt %, about 70 wt %, about 80 wt %, or about 90 wt % of amorphous carbon, or may include 100 wt % of amorphous carbon alone.

The amorphous carbonaceous coating layer may include a material selected from the group consisting of soft carbon (cold calcination carbon), hard carbon, pitch carbide, mesophase carbide, calcined corks, and a combination thereof.

A coating method for the amorphous carbonaceous coating layer may be, but is not limited to, dry coating or liquid coating. Examples of the dry coating are deposition, chemical vapor deposition (CVD), etc, and examples of the liquid coating are impregnation, spraying, etc. For example, a crystalline carbonaceous substrate may be coated with a carbon precursor, such as a coal-based pitch, a mesophase pitch, a petroleum-based pitch, a coal-based oil, a petroleum-based crude oil, an organic synthetic pitch, or a polymer resin, such as a phenol resin, a furan resin, a polyimide resin, or the like, followed by heat treating to form an amorphous carbonaceous coating layer.

The amorphous carbonaceous coating layer may be formed in such a thickness that the amorphous carbonaceous coating layer provides a sufficient conductive passage between carbonaceous substrates without a decrease in battery capacity. For example, the thickness of the amorphous carbonaceous coating layer may be in a range of about 0.1 µm to about 10 µm, or for example, about 0.5 µm to about 10 µm, or for example, about 1 µm to about 5, but is not limited thereto.

If as described above, the carbonaceous substrate 110 includes the amorphous carbonaceous coating layer, the recessed portions 120 may be formed in the amorphous carbonaceous coating layer. Also, the recessed portions 120 may have a depth that extends through the amorphous carbonaceous coating layer and reaches the carbonaceous substrate, and the depth of the recessed portions 120 may be greater than the thickness of the amorphous carbonaceous coating layer.

The silicon-based nanowires 130 are placed in the recessed portions 120.

In this regard, the term "silicon-based" used herein refers to inclusion of at least about 50 wt % of silicon (Si), for example, at least about 60 wt %, about 70 wt %, about 80 wt %, or about 90 wt % of Si, or may include 100 wt % of Si alone. Also, in this regard, the term "nanowire" used herein refers to a wire structure having a nanometer unit of a cross-section diameter. If the diameter of the nanowire is too large, the number of nanowires formed on the carbonaceous substrate may be reduced, and on other hand, if the length of nanowires is too long, the nanowires may be tangled each other. For example, the nanowire may have a cross-section diameter of about 10 nm to about 100 nm and a length of about 0.1 μm to about 10 μm. Also, an aspect ratio (length:width) of each nanowire may be 10 or more, for example, 50 or more, or for example, 100 or more. Also, diameters of nanowires may be substantially identical to or different from each other, and from among longer axises of nanowires, at least a portion may be linear, softly or sharply curved, or branched. Such silicon-based nanowires may withstand the volumetric change of a lithium battery due to charging and discharging.

The silicon-based nanowires 130 may include, for example, a material selected from the group consisting of Si, $SiO_x$ ($0<x\leq2$), Si—Z alloys (where Z is alkali metal, alkali earth metal, a Group 13 element, a Group 14 element, transition metal, a rare earth element, or a combination thereof and is not Si), or a combination thereof, but a material for forming the silicon-based nanowires 130 is not limited thereto. The element Z may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. Also, Si, $SiO_x$, and the alloy of Si and Z may include amorphous silicon, crystalline (including single or poly crystalline) silicon, or a combination thereof. The silicon-based nanowires 130 may include these materials alone or a combination of two or more thereof. For example, Si nanowires may be used as the silicon-based nanowires 130 in consideration of high capacity.

The silicon-based nanowires 130 may be manufactured by directly growing the silicon-based nanowires 130 in the recessed portions 120 of the carbonaceous substrate 110, or by, for example, attaching or coupling silicon-based nanowires which have been grown separately to the inside of the recessed portions 120. The silicon-based nanowires 130 may be placed in the recessed portions 120 by using any known placing methods. For example, a nanowire may be grown by using vapor-liquid-solid (VLS) growth method, or using a nano-sized catalyst that thermally decomposes a precursor gas present nearby. The silicon-based nanowires 130 may be directly grown in the recessed portions 120 of the carbonaceous substrate 110 in the presence or absence of a metal catalyst. Examples of the metal catalyst are Pt, Fe, Ni, Co, Au, Ag, Cu, Zn, Cd, etc.

According to an embodiment of the present invention, because the silicon-based nanowires 130 may expand in a lengthwise direction thereof, the silicon-based nanowires 130 may be grown to an extent that lengths of the silicon-based nanowires 130 are slightly smaller than depths of the recessed portions 120 to allow the recessed portions 120 to withstand the expansion. However, the lengths of the silicon-based nanowires 130 are not limited thereto. For example, even when lengths of the silicon-based nanowires 130 are longer than depths of the recessed portions 120, because the carbonaceous substrate 110 fixes the silicon-based nanowires 130, the volumetric expansion suppression effect may be basically guaranteed.

Figure 3:
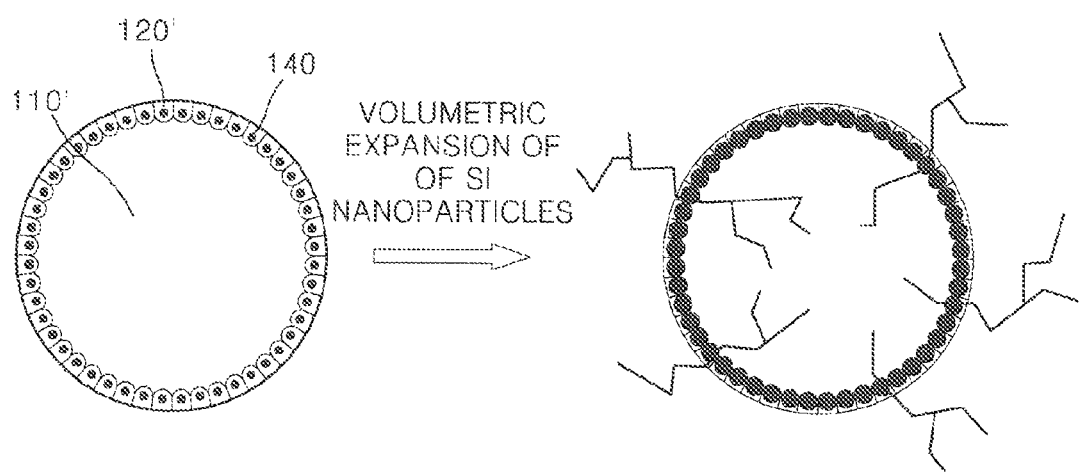
FIG. 3 schematically illustrates cracks of a negative active material constructed as a comparative example when silicon-based nanoparticles volumetrically expand due to charging and discharging.

The silicon-based nanowires 130 described above show better characteristics than silicon-based nanoparticles in terms of an expansion rate. Regarding a silicon material, theoretically, in the case of a structure having a high aspect ratio, such as a nanowire, a volumetric expansion is proportional to a square of a cross-section thereof, and in the case of a spherical structure, a volumetric expansion is proportional to a cube of a cross-section thereof. Thus, a silicon-based nanowire has substantially low volumetric expansion rate than a spherical nanoparticles. FIG. 3 schematically illustrates cracks of a negative active material according to a comparative example when silicon-based nanoparticles 140, instead of silicon-based nanowires, volumetrically expand in recessed portions 120' due to charging and discharging. Referring to FIG. 3, although the recessed portions 120' formed in a carbonaceous substrate 110' withstand volumetric expansion of the silicon-based nanoparticles 140, due to a focused stress caused by 3-dimensional expansion, the negative active material may crack, thereby causing cracks of an electrode plate including the negative active material.

As described above, a silicon-based nanowire having a relatively smaller expansion rate may have a higher capacity per volume, may less likely crack, and may have higher cell stability, than a silicon-based nanoparticle. Also, a silicon-based nanowire has a smaller surface area than its spherical counterpart and thus, silicon may be less oxidized and high initial efficiency may be obtained.

According to an embodiment of the present invention, primary particles having the negative active material structure may be agglomerate or combined with each other, or may form a secondary particle via a combination with other active components.

A lithium battery according to an embodiment of the present invention includes a negative electrode including the negative active material; a positive electrode disposed facing the negative electrode; and an electrolyte interposed between the negative electrode and the positive electrode.

The negative electrode may include the negative active material. The negative electrode may be manufactured by using various methods. For example, the negative active material, a binder, and selectively, a conductive agent are mixed in a solvent to prepare a negative active material composition, and then the negative active material composition is molded in a predetermined shape. Alternatively, the negative active material composition may be applied on a current collector, such as a copper foil or the like.

The binder included in the negative active material composition may aid a bond between the negative active material and, for example, the conductive agent and a bond between the negative active material and the current collector. An amount of the binder herein may be, based on 100 parts by weight of the negative active material, in a range of 1 to 50 parts by weight. For example, the amount of the binder may be in a range of 1 to 30 parts by weight, 1 to 20 parts by weight, or 1 to 15 parts by weight, based on 100 parts by weight of the negative active material. Examples of the binder are polyvinylidenefluoride, polyvinylidenechloride, polybenzimidazole, polyimide, polyvinylacetate, polyacrylonitrile, polyvinylalcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethylenetelethphalate, polytetrafluoroethylene, polyphenylsulfide, polyamideimide, polyetherimide, polyethylenesulfone, polyamide, polyacetal, polyphenyleneoxide, polybutylenetelephthalate, ethylene-propylene-diene terpolymer (EPDM), sulfonated EPDM, styrene butadiene rubber, fluoride rubber, various copolymers, etc.

The negative electrode may further include selectively a conductive agent to provide a conductive passage to the negative active material to further improve electrical conductivity. As the conductive agent, any material used in a typical lithium battery may be used herein. Examples of the conductive agent are a carbonaceous material such as carbon black, acetylene black, ketjen black, carbon fiber (for example, a vapor phase growth carbon fiber), or the like; a metal such as copper, nickel, aluminum, silver, or the like, each of which may be used in powder or fiber form; a conductive polymer such as a polyphenylene derivative; and a mixture thereof. An amount of the conductive agent may be appropriately controlled. For example, the conductive agent may be added in such an amount that a weight ratio of the negative active material to the conductive agent is in a range of 99:1 to 90:10.

The solvent may be N-methylpyrrolidone (NMP), acetone, water, or the like. An amount of the solvent may be in a range of 1 to 10 parts by weight based on 100 parts by weight of the negative active material. If the amount of the solvent is within this range, an active material layer may be easily formed.

Also, the current collector may typically be formed in a thickness of about 3 to about 500. The current collector is not particularly limited as long as the current collector does not cause a chemical change in a battery and has conductivity. Examples of a material that forms the current collector are copper, stainless steel, aluminum, nickel, titanium, calcined carbon, copper and stainless steel that are surface-treated with carbon, nickel, titanium, silver, or the like, an alloy of aluminum and cadmium, etc. Also, an uneven micro structure may be formed on the surface of the current collector to enhance a binding force with the negative active material. Also, the current collector may be used in various forms including a film, a sheet, a foil, a net, a porous structure, a foaming structure, a non-woven structure, etc.

The prepared negative active material composition may be directly coated on a current collector to form a negative electrode plate, or may be cast onto a separate support and a negative active material film separated from the support is laminated on a current collector, such as a copper foil, to obtain a negative electrode plate.

The negative active material composition may be printed on a flexible electrode substrate to manufacture a printable battery, in addition to the use in manufacturing a lithium battery.

Separately, for the manufacture of a positive electrode, a positive active material composition prepared by mixing a positive active material, a conductive agent, a binder, and a solvent is prepared.

As the positive active material, any lithium-containing metal oxide that is conventionally used in the art is used herein. For example, $LiCoO_2$, $LiMn_xO_{2x}$ (where x is 1 or 2), $LiNi_{1-x}Mn_xO_2$ (where $0<x<1$), or $LiNi_{1-x-y}Co_xMn_yO_2$ (where $0 \le x \le 0.5$ and $0 \le y \le 0.5$), or the like may be used. For example, a compound that intercalates and/or deintercalates lithium, such as $LiMn_2O_4$, $LiCoO_2$, $LiNiO_2$, $LiFeO_2$, $V_2O_5$, TiS, MoS, or the like, may be used as the positive active material.

The conductive agent, the binder, and the solvent included in preparing the positive active material composition may be identical to those included in the negative active material composition. In some cases, a plasticizer may be further added to the positive active material composition and the negative active material composition to form pores in a corresponding electrode plate. Amounts of the positive active material, the conductive agent, the binder, and the solvent may be at the same levels used in a conventional lithium battery.

A positive electrode current collector may have a thickness of about 3 to about 500 µm, and may be any of various current collectors that do not cause a chemical change in a battery and has high conductivity. Examples of the positive electrode current collector are stainless steel, aluminum, nickel, titanium, calcined carbon, and aluminum and stainless steel that are surface-treated with carbon, nickel, titanium, silver, or the like. The positive electrode current collector may have an uneven micro structure at its surface to enhance a binding force with the positive active material. Also, the current collector may be used in various forms including a film, a sheet, a foil, a net, a porous structure, a foaming structure, a non-woven structure, etc.

The prepared positive active material composition may be directly coated on the positive electrode current collector to form a positive electrode plate, or may be cast onto a separate support and a positive active material film separated from the support is laminated on the positive electrode current collector, such as a copper foil, to obtain a positive electrode plate.

The positive electrode may be separated from the negative electrode by a separator, and the separator may be any of various separators that are typically used in a lithium battery. For example, the separator may include a material that has a low resistance to migration of ions of an electrolyte and an excellent electrolytic solution-retaining capability. For example, the separator may include a material selected from the group consisting of glass fiber, polyester, Teflon, polyethylene, polypropylene, polytetrafluoroethylene (PTFE), and a combination thereof, each of which may be nonwoven or woven. The separator may have a pore size of about 0.01 to about 10 µm and a thickness of about 5 to about 300 µm.

A lithium salt-containing non-aqueous based electrolyte includes a non-aqueous electrolytic solution and lithium. Examples of the non-aqueous electrolyte are a non-aqueous electrolytic solution, an organic solid electrolyte, an inorganic solid electrolyte, etc.

As the non-aqueous electrolytic solution, a non-protogenic organic solvent may be used, and examples of the non-protogenic organic solvent are N-methyl-2-pyrrolidinone, propylene carbonate, ethylene carbonate, butylene carbonate, dimethyl carbonate, diethyl carbonate, fluorinated ethylenecarbonate, ethylenemethylenecarbonate, methylpropylcarbonate, ethylpropanoate, methylacetate, ethylacetate, propylacetate, dimethylester gamma-butyloractone, 1,2-dimethoxy ethane, tetrahydrofurane, 2-methyl tetrahydrofurane, dimethylsulfoxide, 1,3-dioxorane, formamide, dimethylformamide, dioxorun, acetonitrile, nitromethane, methyl formic acid, trimester phosphoric acid, trimethoxy methane, a dioxolan derivative, sulfolane, methyl sulfolane, 1,3-dimethyl-2-imidazolidinone, a propylene carbonate derivative, a tetrahydrofurane derivative, ether, methyl pyrropionic acid, ethyl pyrropionic acid, etc.

Examples of the organic solid electrolyte are a polyethylene derivative, a polyethylene oxide derivative, a polypropylene oxide derivative, a phosphate ester polymer, polyagitation lysine, polyester sulfide, polyvinyl alcohol, poly fluorinated vinylidene, a polymer having an ionic dissociable group, etc.

Examples of the inorganic solid electrolyte are nitrides, halides, and sulfides of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt may be any one of various lithium salts that are conventionally used in lithium battery. As a material that is dissolved in the non-aqueous electrolyte, for example, one or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $CF_3SO_2$ $_2NLi$, lithiumchloroborate, lower aliphatic carbonic acid lithium, 4 phenyl boric acid lithium, imide, etc may be used.

Lithium batteries may be categorized as a lithium ion battery, a lithium ion polymer battery, or a lithium polymer battery, according to a separator used and an electrolyte used. Lithium batteries may also be categorized as a cylindrical lithium battery, a square-shaped lithium battery, a coin-shaped lithium battery, or a pouch-shaped lithium battery, according to the shape thereof. Lithium batteries may also be categorized as a bulk-type lithium battery or a thin layer-type lithium battery, according to the size thereof. The lithium batteries listed above may be primary batteries or secondary batteries.

A method of manufacturing the lithium batteries is obvious to one skilled in the art and thus will not be described in detail herein.

Figure 4:
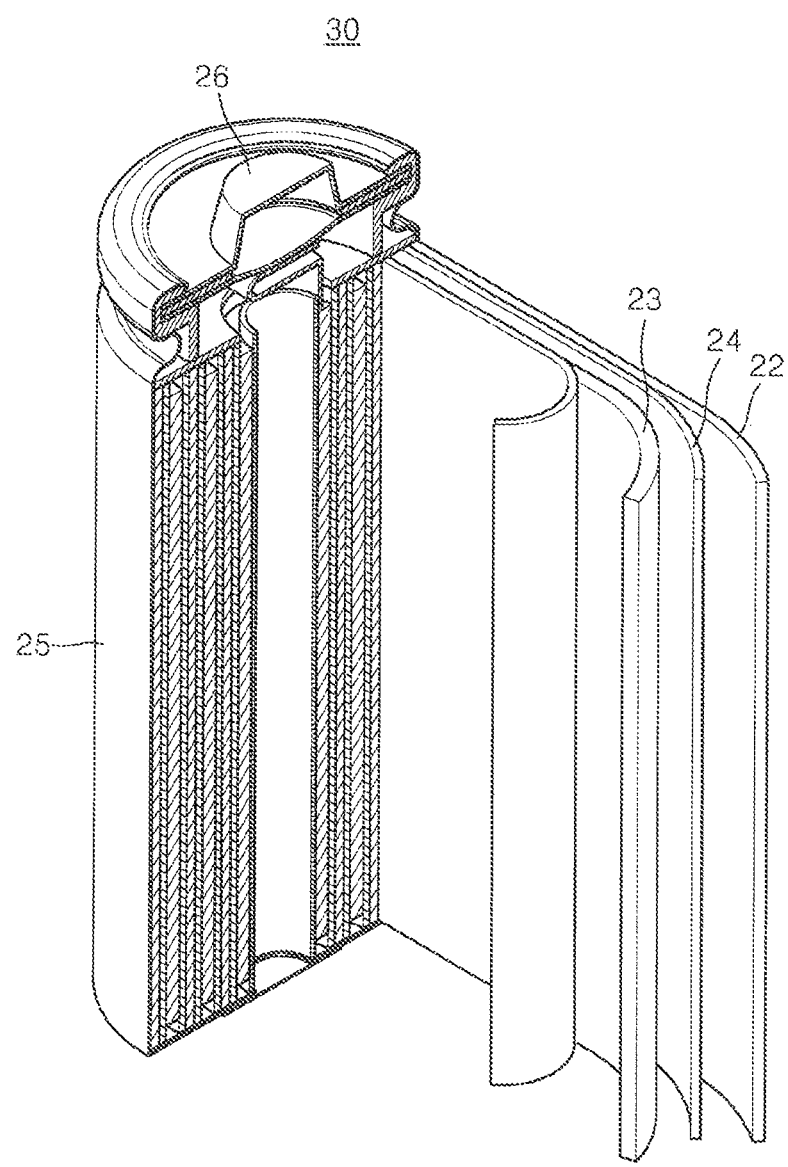
FIG. 4 is a schematic view of a lithium battery constructed as an embodiment according to the principles of the present invention.

FIG. 4 is a schematic view of a lithium battery 30 constructed as an embodiment according to the principles of the present invention.

Referring to FIG. 4, the lithium battery 30 includes a positive electrode 23, a negative electrode 22, and a separator 24 interposed between the positive electrode 23 and the negative electrode 22. The positive electrode 23, the negative electrode 22, and the separator 24 are wound or folded to be housed in a battery case 25. Then, an electrolyte is injected into the battery case 25, followed by sealing with an encapsulation member 26, thereby completing the manufacture of the lithium battery 30. The battery case 25 may be a cylindrical, rectangular, or thin film type case. The lithium battery 30 may be a lithium ion battery.

A lithium battery constructed as an embodiment according to the principles of the present invention may be used in, in addition to a mobile phone or a portable computer, an application, such as an electric vehicle, that requires high capacity, high power output, and high-temperature driving. Also, the lithium battery may be combined with an existing internal-combustion engine, a fuel cell, a super capacitor, or the like for use in a hybrid vehicle, or the like. Furthermore, the lithium battery may be used any other applications that require high power output, high voltage, and high-temperature driving.

As described above, according to the one or more of the above embodiments of the present invention, a negative active material provides separate places for silicon-based nanowires to control volumetric expansion of the silicon-based nanowires, and thus, a formed lithium battery may have improved efficiency and lifetime.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A negative active material, comprising:
a carbonaceous substrate with a plurality of recessed portions at its surface; and
a silicon-based nanowire placed in each of the recessed portions, a length of each of the silicon-based nanowires being smaller than a depth of a corresponding recessed portion.

2. The negative active material of claim 1, wherein the carbonaceous substrate has a spherical or lump shape.

3. The negative active material of claim 2, wherein the carbonaceous substrate has a circularity of about 0.2 to about 1.0.

4. The negative active material of claim 1, wherein the carbonaceous substrate comprises a crystalline carbonaceous material.

5. The negative active material of claim 4, wherein the crystalline carbonaceous material comprises at least one selected from the group consisting of natural graphite, artificial graphite, expandable graphite, graphene, carbon black, and fullerene soot.

6. The negative active material of claim 1, a microstructure found thoughout the carbonaceous substrate including pores therein, a porosity of the carbonaceous substrate being in a range of about 5% to about 30% based on a total volume of the carbonaceous substrate.

7. The negative active material of claim 1, wherein the carbonaceous substrate comprises an amorphous carbonaceous coating layer at its surface and the recessed portions are formed in the amorphous carbonaceous coating layer.

8. The negative active material of claim 1, wherein an average particle size of the carbonaceous substrate is in a range of about 1 µm to about 30 µm.

9. The negative active material of claim 1, wherein the recessed portions have an average diameter of about 50 nm to about 5 µm and a depth of about 1 µm or more.

10. The negative active material of claim 1, wherein the recessed portions are arrayed in a honeycomb shape.

11. The negative active material of claim 1, wherein the silicon-based nanowires comprise at least one material selected from the group consisting of Si, SiOx (0≤x≤2), and Si—Z alloys, where Z is not Si and is an element selected from a group consisting of alkali metal, alkali earth metal, a Group 13 element, a Group 14 element, transition metal, a rare earth element, and a combination thereof.

12. The negative active material of claim 1, wherein the silicon-based nanowire has a diameter of about 10 nm to about 100 nm and a length of about 0.1 µm to about 10 µm.

13. The negative active material of claim 1, wherein the silicon-based nanowires are formed by growth directly in the recessed portions.

14. The negative active material of claim 13, the silicon-based nanowires being formed by growth in the presence of at least one of Pt, Fe, Ni, Co, Au, Ag, Cu, Zn, and Cd.

15. A lithium battery, comprising:
a negative electrode comprising the negative active material of claim 1;
a positive electrode disposed facing the negative electrode; and
an electrolyte disposed between the negative electrode and the positive electrode.

16. The negative active material of claim 1, the silicon-based nanowires being formed by growth in the absence of a metal catalyst.

* * * * *